Jan. 8, 1935. J. L. CREVELING 1,987,099
LUBRICATING DEVICE
Filed Dec. 30, 1932

INVENTOR.
JOHN L. CREVELING
BY
ATTORNEY.

Patented Jan. 8, 1935

1,987,099

UNITED STATES PATENT OFFICE 1,987,099

LUBRICATING DEVICE

John L. Creveling, near Tucson, Ariz., assignor to The Lubrication Corporation, Chicago, Ill., a corporation of Delaware Application December 30, 1932, Serial No. 649,463

6 Claims. (Cl. 184—105)

This invention relates to improvements in lubricating devices and more particularly to lubricant receiving fittings through which lubricant may be fed from a suitable lubricant feeding device into bearings and other mechanism to be lubricated.

Many types of lubricant receiving fittings have been provided for use in facilitating the lubricant servicing operation on automobile chassis and machinery, all of which have the feature in common to permanent or semi-permanent mounting upon the bearing or part to be lubricated and providing an exposed head portion for engagement with a lubricant discharge nozzle. Frequently, through accident or abuse, the head of the fitting is broken off due to its obvious exposure and necessarily freely accessible position on the chassis or machine. This occurrence, in the past, has necessitated a complete removal of the fitting and the substitution of a new fitting which may, at many times, be highly inconvenient due to the lack of replacement fittings at hand.

An object of the invention is to provide a lubricant receiving fitting which, in its primary form, is intended for use with a particular type of nozzle and wherein the severing or breaking away of the head of the fitting presents the fitting in its secondary form having the contour necessary to adapt it to another type of lubricant discharge nozzle.

Another object is to provide a lubricant receiving fitting of the character described, which is purposely formed so as to cause the head to be severed from the fitting body in a predetermined plane perpendicular to the axis thereof when sufficient force or impact through accident or carelessness is applied to the head in an amount sufficient to cause the head to break away from the body.

A further object is to provide a lubricant receiving fitting as described which in its primary and secondary embodiment is adapted to provide a lubricant tight seal with a lubricant discharge nozzle by an annular metal to metal sealing contact therebetween.

Other objects, the advantages, and uses of the invention, will be, or should become, apparent after reading the following description and claims and after consideration of the accompanying drawing forming a part of this specification, in which:

In general, the lubricant receiving fitting selected for illustration herein comprises, a body A having a shank B for securing the fitting within the mouth of the lubricant passageway of a bearing or other mechanism to be lubricated, a campaniform neck portion C, a spherical head D at the outer end of the neck, and an annular groove E formed at the juncture of the head and neck portions located in a plane perpendicular to the axis thereof.

Figures 1, 3:
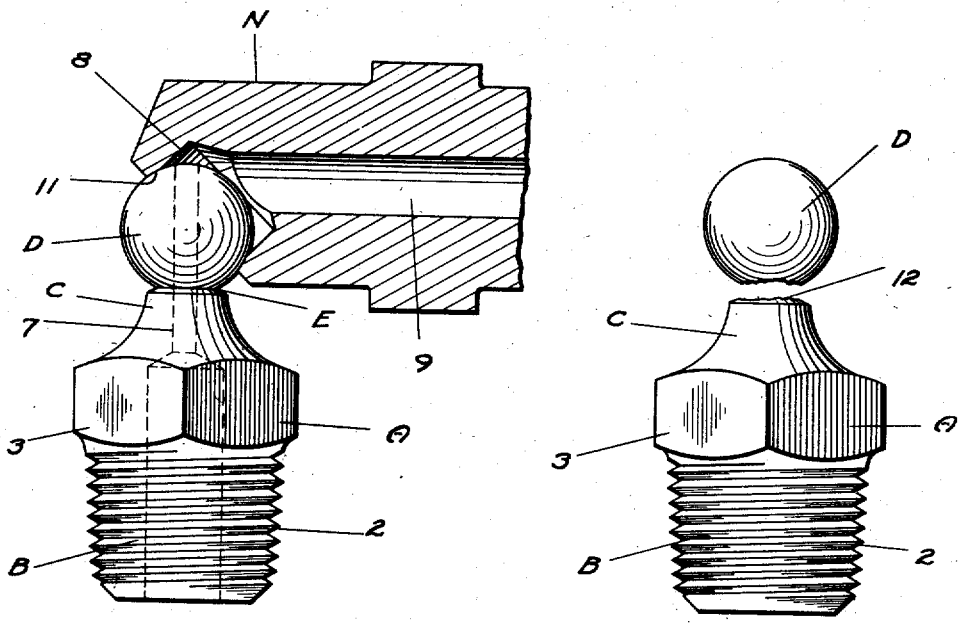
Fig. 1 is a side elevation of a fitting constructed in accordance with the invention in its primary embodiment.
Fig. 3 is a side elevation of the fitting in Fig. 1 with the head broken away.
Figures 2, 4:
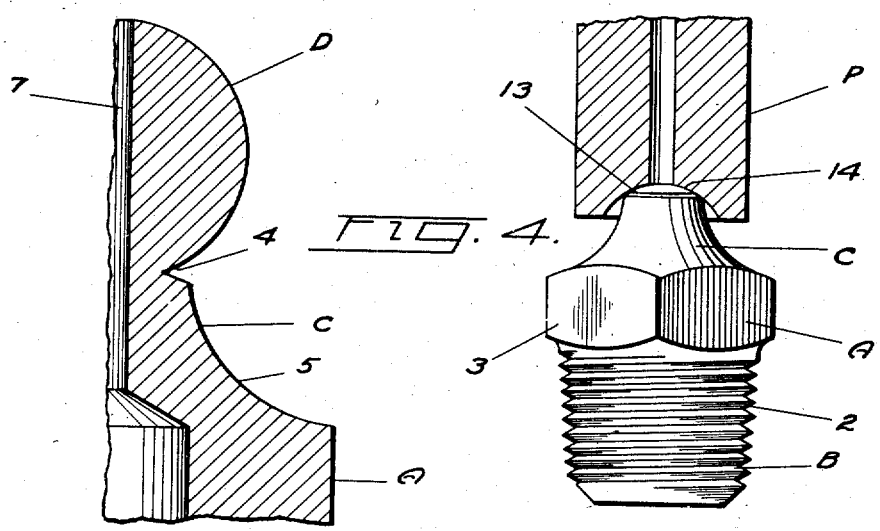
Fig. 2 is an enlarged fragmentary sectional view of the fitting of Fig. 1.
Fig. 4 is a side elevation of the lubricant receiving fitting in its secondary embodiment.

Referring particularly to Figs. 1 and 2, the shank B may be provided with screw threads 2 for fixing the shank within an internally threaded portion of the bearing passageway, and the body A may be provided with an hexagenal flange 3 to facilitate the turning of the fitting in place. The upper wall of the groove E is preferably curved as shown at 4 to follow the curve of the head D. A lubricant passageway 7 extends longitudinally through the fitting and has its mouth preferably located centrally of the spherical head D.

The fitting, as shown in Fig. 1, is adapted, through the medium of its spherical head D, for annular sealing engagement with a nozzle such as the contact nozzle N, wherein a pocket 8 is formed at the mouth of the discharge passageway 9 thereof within which the fitting head may be partially received, so that an annular metal to metal contact between the spherical surface of the head and the outer portions 11 of the walls of the pocket 8 may be had. The advantage attained by the fitting of Fig. 1 in its primary form is that a relatively wide angular range of movement between the nozzle N and the fitting is provided, thereby obviating the necessity of employing special angle fittings to lubricate bearings, or other parts, which may be capable of approach through but a narrow range of nozzle movement.

It is intended that the fitting shall be used upon an automobile chassis or other mechanism to be lubricated in its primary form as shown in Figs. 1 and 2 and only that through excessive abuse or accident sufficient to cause the mutilation or complete breaking away of the head D that it shall be employed in its secondary embodiment as shown in Fig. 4.

Assuming that the fitting head has become so badly mutilated through abuse that it is no longer capable of performing its cooperative sealing function with the nozzle N, the operator, instead of discarding the fitting and seeking replacement thereof, may sever the head from the neck C of the body A by a laterally directed blow with a hammer or other implement. The fitting will then have the appearance substantially as shown in Fig. 3, there being a relatively rough surface 12 at the place where the head B was severed. This surface 12 may be filed smooth, as shown at 13, by a few strokes of a mechanic's file and the fitting thereupon assumes its secondary embodiment as shown in Fig. 4 without the necessity of removal from the bearing or any other preparation.

While the fitting is in its secondary embodiment as shown in Fig. 4 the lower wall of the groove E assumes its function as an annular contacting surface with which the concave and spherical side walls 14 of the discharge orifice of a nozzle P may engage to provide an annular metal to metal lubricant tight seal therewith. While the angular range of movement of the nozzle P with the fitting as shown in Fig. 4 is not as great as that of the nozzle N with the fitting, as shown in Fig. 1, it provides a new lease of life to the otherwise mutilated and totally inoperative fitting. The advantage gained is thought to be apparent and considerable economy in the cost of the maintenance of lubricant receiving fittings, particularly upon automobile chassis may be thus accomplished.

It is to be understood that the described embodiments of the invention herein set forth are presented for the purpose of illustration only and various changes may be made therein without departing from the spirit and scope of the invention.

I claim:

1. A lubricant receiving fitting comprising a metal body formed with integral head and shank portions and having a lubricant passageway extending longitudinally therethrough, said fitting having an annular groove, V-shaped in cross-section, formed at the base of said head portion concentric with the axis of said pasageway provided an annular edge at the shank side of the groove for sealing engagement with a concave nozzle upon the severing of the head from the shank along said groove.

2. A lubricant receiving fitting comprising a metal body formed with an integral spherical head and a shank portion and having a lubricant passageway extending longitudinally therethrough, said fitting having an annular groove formed in the shank portion at the base of said head portion concentric with the axis of said passageway the shank side of the groove being formed to provide a nozzle engaging contact portion accessible upon the severing of said head from the shank.

3. A lubricant receiving fitting comprising a metal body formed with integral head and shank portions and having a lubricant passageway extending longitudinally therethrough, said fitting having an annular groove formed in the shank portion at the base of said head portion concentric with the axis of said passageway and located in a plane perpendicular to the axis of the body the shank side of the groove being formed to provide a nozzle engaging contact portion accessible upon the severing of said head from the shank.

4. A lubricant receiving fitting comprising a metal body formed with an integral head portion separated from the body by a neck portion, said fitting being circumferentially grooved between the head and neck portions, the neck side of the groove comprising a preformed annular edge adapted for universal sealing engagement with a lubricant discharge nozzle having a concave and spherical walled discharge orifice, said edge being accessible for engagement by said nozzle upon the severing of said head portion from said neck portion along the base of said groove.

5. A lubricant receiving fitting comprising a metal body formed with an integral head separated from the body by a neck, said fitting having a V-shaped groove surrounding the axis thereof substantially at the juncture of the head and neck whereby to direct a path of fracture between said head and said neck, the neck at the side of said groove being formed to provide a nozzle engageable edge for sealing engagement with a concave nozzle upon severance of said head from said neck.

6. A lubricant receiving fitting comprising a metal body formed with an integral head separated from the body by a neck, said fitting having a V-shaped groove surrounding the axis thereof substantially at the juncture of the head and neck whereby to direct a path of fracture between said head and said neck, the neck at the side of said groove being formed to provide a preformed annular nozzle engageable edge located in a plane perpendicular to the axis of the fitting for sealing engagement with a concave nozzle upon severance of said head from said neck.

JOHN L. CREVELING.